| United States Patent [19] | [11] 3,928,444 |
|---|---|
| Kamada et al. | [45] Dec. 23, 1975 |

[54] PROCESS FOR HYDROLYZING DICYAN

[75] Inventors: Sueo Kamada; Takeshi Yamashita; Tohru Ide; Ryogo Ajiki; Takao Kitamura, all of Nobeoka, Japan

[73] Assignee: Asahi Kasei Kogyo Kabushiki Kaisha, Osaka, Japan

[22] Filed: Nov. 25, 1974

[21] Appl. No.: 526,739

[30] Foreign Application Priority Data
Nov. 28, 1973  Japan.............................. 48-132576
Dec. 11, 1973  Japan.............................. 48-137314

[52] U.S. Cl........................... 260/561 K; 260/561 N
[51] Int. Cl.²..................................... C07C 103/08
[58] Field of Search..................... 260/561 K, 561 N

[56] References Cited
UNITED STATES PATENTS

| 3,381,034 | 4/1968 | Greene et al.............. 260/561 N |
|---|---|---|
| 3,597,481 | 8/1971 | Tefertiller et al............ 260/561 N |
| 3,600,411 | 8/1971 | Lusslinq et al.............. 260/561 K |
| 3,714,251 | 1/1973 | Lusslinq et al.............. 260/561 K |

*Primary Examiner*—C. Davis
*Attorney, Agent, or Firm*—Armstrong, Nikaido & Wegner

[57] ABSTRACT

Oxamide is prepared by hydrolyzing dicyan in an aqueous solution containing as catalyst (a) one or more molybdates and/or tungstates, (b) at least one metal ion selected from the group consisting of zinc, copper, nickel, cobalt, iron and manganese ions, and, if further required, (c) one or more citrates and/or malates, at a temperature of from 0° to 90°C and pH of from 1 to 6.5.

12 Claims, No Drawings

PROCESS FOR HYDROLYZING DICYAN

This invention relates to hydrolysis of dicyan. More particularly, this invention relates to a process for preparing oxamide comprising hydrolyzing dicyan in an aqueous solution containing one or more molybdates and/or tungstates and at least one specific metal ion and, if required, one or more citrates and/or malates.

Various processes have been proposed for preparing oxamide which is used as a stabilizer for nitrocellulose preparations, a starting material for organic syntheses, slow release fertilizer or the like. One typical process for preparing oxamide is to hydrolyze dicyan in concentrated hydrochloric acid. But this process has many defects in that selection of materials used for the apparatus is very difficult since concentrated hydrochloric acid is used and that there are various problems in filtration, separation and the like. Another typical process for preparing oxamide is to hydrolyze dicyan in an aqueous solution of water-soluble ketone and bicarbonate. But this process has many defects in that when the reaction is carried out above 30°C, the product is colored and by-products are also produced and that the yield of oxamide is about 80% at most even when the reaction is carried out below 10°C.

The present inventors have studied the hydrolysis of dicyan using an aqueous solution of metal salts as catalyst in order to overcome the defects of the above-mentioned processes and found that an aqueous solution of a molybdate and/or tungstate can absorb dicyan very well to form cyanoformamide as shown in the following scheme (1):

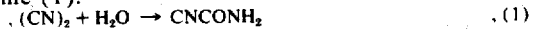
$$(CN)_2 + H_2O \rightarrow CNCONH_2 \qquad (1)$$

and further that when the reaction mixture is allowed to stand at room temperature, oxamide is formed as follows:

$$CNCONH_2 + H_2O \rightarrow (CONH_2)_2 \qquad (2)$$

The formation rate of cyanoformamide shown in the scheme (1) is very great at room temperature and atmospheric pressure and the reaction can proceed almost quantitatively. But the formation of oxamide shown in the scheme (2) is relatively slow and the yield is 20 – 40% after standing overnight.

The present inventors have studied metal ion catalysts effective for the above reaction (2) to yield oxamide and accomplished the present invention.

It is an object of the present invention to provide an improved process for preparing oxamide by hydrolyzing dicyan under mild conditions with excellent yield. It is another object of the present invention to provide an effective catalyst composition for hydrolyzing dicyan to form oxamide. Further objects and advantages of the present invention will be apparent to one skilled in the art from the accompanying disclosure and discussion.

The present invention provides a process for preparing oxamide which comprises hydrolyzing dicyan in an aqueous solution containing a. one or more molybdates and/or tungstates, and b. at least one metal ion selected from the goup consisting of zinc, copper, nickel, cobalt, iron and manganese ions, and, if further required, c. one or more citrates and/or malates.

According to the present invention, dicyan can easily be hydrolyzed in an admixed aqueous solution containing one or more molybdates and/or tungstates and at least one metal ion as mentioned above (b) and the deposition of oxamide begins after few minutes from the beginning of the reaction. Thus oxamide can be obtained in 80% yield or more by allowing the reaction mixture to stand for 30 minutes after the stop of dicyan feed and separating it. In the above reaction, however, about 10% of the reacted dicyan remains as cyanoformamide in the aqueous solution. When an admixed aqueous solution containing one or more citrates and/or malates in addition to the above-mentioned components (a) and (b) is used as catalyst, the yield of oxamide increases up to 97%.

The present invention is explained more concretely in the case of using ammonium heptamolybdate, $(NH_4)_6[Mo_7O_{24}] \cdot 4H_2O$, zinc nitrate, $Zn(NO_3)_2 \cdot 6H_2O$ and ammonium hydrogen citrate, $(NH_4)_2HC_6H_5O_7$.

Ammonium heptamolybdate (3 g) and 2 g of zinc nitrate are dissolved in 50 ml of water and pH of the resulting solution is adjusted to 4.5. After reacting 5.85 g of dicyan in said solution at 50°C for 60 minutes, the absorption of dicyan (percent of absorbed dicyan per the dicyan used) is 90% and the yield of oxamide is 7.8 g. This corresponds to 80% yield of oxamide (mole percent of the oxamide obtained per the dicyan used) and 90% selectivity for oxamide (mole percent of the oxamide obtained per the dicyan absorbed). The yield of and selectivity for oxamide are sufficiently high for practical production. But when an aqueous solution containing 3 g of ammonium hydrogen citrate in addition to the above-mentioned solution is used in the hydrolysis of dicyan, absorption of dicyan increases to 94% and the yield of oxamide increases to 9.20 g. This corresponds to 93% yield of oxamide and 99% selectivity for oxamide. As is clear from the above result, the use of citrate greatly increases the yield of and selectivity for oxamide.

In the above latter case, whe pH of the aqueous solution is adjusted to 5.0 without adding ammonium hydrogen citrate, zinc hydroxide begins to precipitate and the concentration of zinc ion becomes below 2%. But when 2 g of ammonium hydrogen citrate is added to the solution, zinc hydroxide is dissolved again in the solution and no precipitation takes place even at pH 6. When dicyan is reacted as mentioned above in the aqueous solution adjusted at pH 5.5, the absorption of dicyan is 97% and the yield of oxamide increases to 96.5% with selectivity for oxamide being 99.5%.

The excellent effect of ammonium hydrogen citrate can only be obtained in the presence of both ammonium heptamolybdate and zinc nitrate. That is, ammonium hydrogen citrate with ammonium heptamolybdate cannot accelerate the formation of oxamide and ammonium hydrogen citrate with zinc nitrate hardly brings about the reaction of dicyan.

As the molybdates, sodium molybdate ($Na_2MoO_4 \cdot 2H_2O$), potassium molybdate ($K_2MoO_4 \cdot 5H_2O$), sodium trimolybdate ($Na_2Mo_3O_{10} \cdot 7H_2O$), ammonium heptamolybdate ($(NH_4)_6[Mo_7O_{27}] \cdot 4H_2O$), sodium octamolybdate ($Na_4[MO_8O_{25}] \cdot 17H_2O$) or the like are preferably used.

As the tungstates, sodium tungstate ($Na_2WO_4 \cdot 2H_2O$), potassium tungstate ($K_2WO_4$), decaammonium dodecatungstate ($(NH_4)_{10}[W_{12}O_{46}H_{10}] \cdot 5H_2O$), decapotassium dodecatungstate ($K_{10}[W_{12}O_{46}H_{10}] \cdot 6H_2O$), decasodium dodecatungstate ($Na_{10}[W_{12}O_{46}H_{10}] \cdot 23H_2O$) or the like are preferably used.

These molybdates and tungstates are used in the form of an aqueous solution. One or more molybdates may be used together with one or more tungstates. The concentration of one or more molybdates or one or more tungstates or a mixture thereof is preferable from 0.05% by weight to the solubility of the salt in the silution, more preferably from 0.05 to 10% by weight based on the weight of the aqueous solution.

As the metal inons which are added to accelerate the formation of oxamide in the scheme (2), zinc, copper, nickel, cobalt, iron and manganese ions are used preferably in the form of hydrochlorides, sulfates, nitrates, acetates, or the like. At least one metal ion is used as the component (b) in an amount of, as a metal salt, preferably from 0.01% by weight to the solubility of its salt, more preferably from 0.01 to 10% by weight based on the weight of the aqueous solution.

As the citrates or malates which are additionally added to the aqueous solution to more accelerate the formation of oxamide and to more increase the yield of oxamide, sodium, potassium and ammonium salts of citrates or malates may be used. One or more citrates may be used together with one or more malates. Citric acid or malic acid itself may be added to an aqueous solution in which it is neutralized with sodium hydroxide, potassium hydroxide, ammonia water or the like to form a citrate or malate. The concentration of one or more citrates or one or more malates or a mixture thereof is preferably from 0.5 to 20% by weight based on the weight of the aqueous solution.

pH of the aqueous solution which is used as catalyst in hydrolysis of dicyan is preferably from 1 to 6.5, more preferably from 3 to 6.5. When the pH is below 1, the rate of hydrolysis decreases. Whe the pH is above 6.5, there brings about side reactions, coloration, evolution of carbon dioxide, and the like. Adjustment of pH is carried out by adding an acid or alkali.

The reaction temperature is preferably from 0° to 90°C, more preferably from 20° to 70°C.

The reaction may be carried out under high pressure but usually it may be carried out under atmospheric pressure at room temperature.

The hydrolysis of dicyan after the absorption of dicyan may be carried out slowly with sufficient time but usually the reaction may be completed for 30 – 60 minutes.

Dicyan in gaseous state is supplied to the catalytic aqueous solution by blowing so as to disperse well. In industrial production, dicyan is preferably supplied to the aqueous solution, not so strictly limited but from absorption efficiency, so as to deposit less than 7 – 8 g of oxamide from 50 ml of the aqueous solution per hour. In order to increase the efficiency, ordinary industrial absorbers such as a wetted-wall tower may be used.

Oxamide produced can be separated by a conventional process.

According to the present invention, oxamide can be obtained in excellent yield as high as 85% by hydrolyzing dicyan in an aqueous solution containing one or more molybdates and/or tungstates and at least one metal ion as defined in the component (b). The oxamide yield can be increased upto 97% by the use of an aqueous solution containing (a) one or more molybdates and/or tungstate, (b) at least one metal ion from zinc, copper, nickel, cobalt, iron and manganese ions and (c) one or more citrates and/or malates. Further, since the selection of reaction apparatus and means is very easy, the process of the present invention is suitable for industrial production of oxamide useful as slow release fertilizer.

The invention is illustrated more particularly by way of the following examples.

EXAMPLE 1

In a 70 ml test tube, 5 g of sodium molybdate ($Na_2MoO_4 \cdot 2H_2O$) and 5 g of zinc nitrate ($Zn(NO_3)_2 \cdot 6H_2O$) were dissolved in 50 ml of water. The resulting solution was adjusted to pH 3 by adding a 20% $HNO_3$ solution. Dicyan gas of 90% purity was blown into the solution with dispersing at the rate of 5.85 g/hour and reacted at 50°C for 60 minutes. Oxamide began to deposit after 7 minutes from the beginning of the reaction. Conversion of dicyan was 91%, which was determined by analyzing outlet gases using gas chromatography during the reaction. After completion of the reaction, the reaction mixture was allowed to stand for 30 minutes and then the deposit was separated by filtration, washed with water and dried to give 8.10 g of oxamide. The yield of oxamide was 82% and selectivity for oxamide was 90%.

COMPARATIVE EXAMPLE 1

In a 70 ml test tube, 50 ml of 35% hydrochloric acid was placed. Dicyan gas of 90% purity was blown into the solution with dispersing at the rate of 50 ml/ minute and reacted at 30°C for 60 minutes. Conversion of dicyan was 64%, which was determined by analyzing outlet gases using gas chromatography. After completion of the reaction, the deposit was filtered, washed with water and dried to give 5.54 g of oxamide. The yield of oxamide was 56% and selectivity for oxamide was 93%.

EXAMPLES 2 – 10

Using catalyst compositions as listed in Table 1, the reactions were carried out according to Example 1. The results are as shown in Table 1.

TABLE 1

| Example No. | Catalyst Name | Amount (g) | Reactants $(CN)_2$ (g) | Reactants $H_2O$ (g) | Reaction Conditions pH | Reaction Conditions Temp. (°C) | Reaction Conditions Time (min) | Conversion of $(CN)_2$ (%) | Oxamide Yield (g) | Oxamide Yield (%) | Selectivity (%) |
|---|---|---|---|---|---|---|---|---|---|---|---|
| 2 | $Na_2MoO_4 \cdot 2H_2O$ <br> $ZnSO_4 \cdot 7H_2O$ | 0.025 <br> 0.3 | 5.85 | 50 | 4.5 | 80 | 60 | 79 | 6.25 | 63 | 80 |
| 3 | $(NH_4)_6Mo_7O_{24} \cdot 4H_2O$ <br> $FeCl_3 \cdot 6H_2O$ | 3.0 <br> 0.8 | 5.85 | 50 | 3.5 | 50 | 60 | 93 | 8.11 | 82 | 88 |
| 4 | $Na_2WO_4 \cdot 2H_2O$ <br> $NiCl_2 \cdot 6H_2O$ <br> $Fe(NO_3)_3 \cdot 9H_2O$ | 3.0 <br> 0.5 <br> 0.5 | 5.85 | 50 | 1.2 | 30 | 60 | 82 | 5.60 | 57 | 69 |
| 5 | $(NH_4)_{10}[W_{12}O_{46}H_{10}] \cdot 6H_2O$ <br> $Mn(NO_3)_2 \cdot 6H_2O$ | 1.0 <br> 1.0 | 5.85 | 50 | 3.1 | 20 | 60 | 90 | 7.39 | 75 | 83 |
| 6 | $Na_2MoO_4 \cdot 2H_2O$ <br> $Cu(NO_3)_2 \cdot 3H_2O$ | 3.0 <br> 5.0 | 5.85 | 50 | 2.5 | 5 | 60 | 83 | 7.40 | 75 | 90 |

TABLE 1-continued

| Example No. | Catalyst Name | Amount (g) | Reactants (CN)$_2$ (g) | Reactants H$_2$O (g) | pH | Reaction Conditions Temp. (°C) | Reaction Conditions Time (min) | Conversion of (CN)$_2$ (%) | Oxamide Yield (g) | Oxamide Yield (%) | Selectivity (%) |
|---|---|---|---|---|---|---|---|---|---|---|---|
| 7 | (NH$_4$)$_6$Mo$_7$O$_{24}$ . 4H$_2$O<br>(NH$_4$)$_{10}$[W$_{12}$O$_{46}$H$_{10}$] . 6H$_2$O<br>NiCl$_2$ . 6H$_2$O | 1.5<br>1.5<br>1.0 | 5.85 | 50 | 4.1 | 40 | 60 | 89 | 6.87 | 69 | 78 |
| 8 | Na$_2$MoO$_4$ . 2H$_2$O<br>ZnCl$_2$<br>Mn(NO$_3$)$_2$ . 6H$_2$O | 3.0<br>0.3<br>0.5 | 5.85 | 50 | 3.0 | 50 | 60 | 86 | 6.98 | 71 | 82 |
| 9 | Na$_2$WO$_4$ . 2H$_2$O<br>K$_2$MoO$_4$ . 5H$_2$O<br>Zn(NO$_3$)$_2$ . 6H$_2$O | 1.0<br>0.3<br>1.3 | 5.85 | 50 | 6.3 | 50 | 60 | 93 | 8.28 | 84 | 90 |
| 10 | Na$_2$MoO$_4$ . 2H$_2$O<br>Co(NO$_3$)$_2$ . 6H$_2$O | 3.0<br>3.0 | 5.85 | 50 | 4.5 | 40 | 60 | 90 | 7.65 | 77 | 86 |

EXAMPLE 11

In a 70 ml test tube, 3 g of sodium molybdate (Na$_2$MoO$_4$·2H$_2$O), 3 g of zinc nitrate (Zn(NO$_3$)$_2$·6H$_2$O) and 3 g of ammonium hydrogen citrate ((NH$_4$)$_2$HC$_6$H$_5$O$_7$) were dissolved in 50 ml of water. Dicyan gas of 90% purity was blown into the solution adjusted to pH 6.3 and the reaction was carried out according to Example 1. Conversion of dicyan was 97%. The yield of oxamide was 9.53 g (96%) and selectivity for oxamide was 99.3%.

EXAMPLES 12 – 20

Using catalyst compositions as listed in Table 2, the reactions were carried out according to Example 11. The results are as shown in Table 2.

What is claimed is:

1. A process for preparing oxamide which comprises hydrolyzing dicyan in an aqueous solution containing as catalyst
   a. one or more molybdates and/or tungstates, and
   b. at least one metal ion selected from the group consisting of zinc, copper, nickel, cobalt, iron and manganese ions.

2. A process according to claim 1, wherein the molybdate is sodium molybdate, potassium molybdate, sodium trimolybdate, ammonium heptamolybdate or sodium octamolybdate.

3. A process according to claim 1, wherein the tungstate is sodium tungstate, potassium tungstate, decaammonium dodecatungstate, decapotassium dodecatungstate or decasodium dodecatungstate.

TABLE 2

| Example No. | Catalyst Name | Amount (g) | Reactants (CN)$_2$ (g) | Reactants H$_2$O (g) | pH | Reaction Conditions Temp. (°C) | Reaction Conditions Time (min) | Conversion of (CN)$_2$ (%) | Oxamide Yield (g) | Oxamide Yield (%) | Selectivity (%) |
|---|---|---|---|---|---|---|---|---|---|---|---|
| 12 | Na$_2$MoO$_4$ . 2H$_2$O<br>ZnSO$_4$ . 7H$_2$O<br>Na$_2$HC$_6$H$_5$O$_7$ . H$_2$O | 0.025<br>0.3<br>0.25 | 5.85 | 50 | 3.5 | 90 | 60 | 82 | 7.06 | 71 | 87 |
| 13 | (NH$_4$)$_6$Mo$_7$O$_{24}$ . 4H$_2$O<br>Cu(NO$_3$)$_2$ . 3H$_2$O<br>(NH$_4$)$_2$HC$_6$H$_5$O$_7$ | 3.0<br>0.06<br>3.5 | 5.85 | 50 | 5.3 | 30 | 60 | 93 | 8.53 | 86 | 93 |
| 14 | Na$_2$WO$_4$ . 2H$_2$O<br>Mn(NO$_3$)$_2$ . 6H$_2$O<br>K$_2$HC$_6$H$_5$O$_7$ | 1.0<br>1.0<br>1.0 | 5.85 | 50 | 4.5 | 15 | 60 | 95 | 9.02 | 91 | 96 |
| 15 | K$_2$MoO$_4$ · 5H$_2$O<br>NiCl$_2$ . 6H$_2$O<br>Na$_3$C$_6$H$_5$O$_7$ . H$_2$O | 2.0<br>1.0<br>2.0 | 5.85 | 50 | 2.8 | 4 | 60 | 94 | 8.56 | 86 | 92 |
| 16 | (NH$_4$)$_{10}$[W$_{12}$O$_{46}$H$_{10}$] . 6H$_2$O<br>Zn(NO$_3$)$_2$ . 6H$_2$O<br>Cu(NO$_3$)$_2$ . 3H$_2$O<br>H$_3$C$_6$H$_5$O$_7$ . H$_2$O | 0.5<br>0.5<br>0.5<br>2.0 | 5.85 | 50 | 1.5 | 50 | 60 | 90 | 8.28 | 84 | 93 |
| 17 | Na$_2$MoO$_4$ . 2H$_2$O<br>(NH$_4$)$_6$Mo$_7$O$_{24}$ . 4H$_2$O<br>Fe(NO$_3$)$_2$ . 9H$_2$O<br>(NH$_4$)$_3$C$_6$H$_5$O$_7$ | 0.5<br>0.5<br>1.0<br>3.0 | 5.85 | 50 | 5.5 | 50 | 60 | 96 | 8.70 | 88 | 92 |
| 18 | Na$_2$WO$_4$ . 2H$_2$O<br>K$_2$MoO$_4$ . 5H$_2$O<br>Zn(NO$_3$)$_2$ . 6H$_2$O<br>Mn(NO$_3$)$_2$ . 6H$_2$O<br>(NH$_4$)$_2$HC$_6$H$_5$O$_7$<br>Na$_2$C$_4$H$_4$O$_5$ | 1.0<br>1.0<br>0.5<br>0.5<br>2.0<br>2.0 | 5.85 | 50 | 5.5 | 30 | 60 | 97 | 9.31 | 94 | 97 |
| 19 | Na$_2$MoO$_4$ . 2H$_2$O<br>K$_2$MoO$_4$ . 5H$_2$O<br>ZnSO$_4$ . 7H$_2$O<br>(NH$_4$)$_2$C$_4$H$_4$O$_5$ | 1.5<br>1.5<br>3.0<br>4.0 | 5.85 | 50 | 6.0 | 70 | 60 | 98 | 9.62 | 97 | 99.2 |
| 20 | Na$_2$MoO$_4$ . 2H$_2$O<br>Co(NO$_3$)$_2$ . 6H$_2$O<br>Na$_3$C$_6$H$_5$O$_7$ . 2H$_2$O | 3.0<br>3.0<br>3.0 | 5.85 | 50 | 5.5 | 40 | 60 | 97 | 8.99 | 91 | 94 |

4. A process according to claim 1, wherein the aqueous solution contains 0.05 to 10% by weight of one or more molybdates and/or tungstates and 0.01 to 10% by weight of at least one metal ion as a metal salt based on the weight of the aqueous solution.

5. A process according to claim 1, wherein the hydrolysis is carried out at a pH of from 1 to 6.5.

6. A process for preparing oxamide which comprises hydrolyzing dicyan in an aqueous solution containing as catalyst
   a. one or more molybdates and/or tungstates;
   b. at least one metal ion selected from the group consisting of zinc, copper, nickel, cobalt, iron and manganese ions, and
   c. one or more citrates and/or malates.

7. A process according to claim 6, wherein the citrate is sodium, potassium or ammonium citrate.

8. A process according to claim 6, wherein the malate is sodium, potassium or ammonium malate.

9. A process according to claim 6, wherein the aqueous solution contains 0.05 to 10% by weight of one or more molybdates and/or tungstates, 0.01 to 10% by weight of at least one metal ion as a metal salt and 0.5 to 20% by weight of one or more citrates and/or malates based on the weight of the aqueous solution.

10. A process according to claim 6, wherein the hydrolysis is carried out at a pH of from 1 to 6.5.

11. A process according to claim 1, wherein the hydrolysis is carried out at a temperature of from 0° to 90°C.

12. A process according to claim 6, wherein the hydrolysis is carried out at a temperature of from 0° to 90°C.

* * * * *